United States Patent
Kuroda

(10) Patent No.: US 9,936,174 B2
(45) Date of Patent: Apr. 3, 2018

(54) PROJECTOR AND METHOD OF PREVENTING IMAGE DETERIORATION THEREOF

(71) Applicant: FUJIFILM Corporation, Tokyo (JP)

(72) Inventor: Yasuto Kuroda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/695,483

(22) Filed: Sep. 5, 2017

(65) Prior Publication Data

US 2017/0366788 A1     Dec. 21, 2017

Related U.S. Application Data

(63) Continuation of application No. PCT/JP2016/053119, filed on Feb. 3, 2016.

(30) Foreign Application Priority Data

Mar. 31, 2015   (JP) .................................. 2015-071424

(51) Int. Cl.
```
G03B 21/16    (2006.01)
H04N 9/31     (2006.01)
H04N 5/74     (2006.01)
G02B 7/02     (2006.01)
```

(52) U.S. Cl.
CPC .............. *H04N 9/31* (2013.01); *G02B 7/021* (2013.01); *G02B 7/028* (2013.01); *G03B 21/16* (2013.01); *H04N 5/74* (2013.01); *H04N 9/3144* (2013.01)

(58) Field of Classification Search
CPC ...... G03B 21/16; H04N 9/3144; G02B 7/028; G02B 7/023; G02B 7/02

USPC .............................. 353/100, 61, 84; 359/811
See application file for complete search history.

(56) References Cited

U.S. PATENT DOCUMENTS

2011/0234989 A1    9/2011   Kudo

FOREIGN PATENT DOCUMENTS

| JP | 2004-082166 A | 3/2004 |
| JP | 2005-331790 A | 12/2005 |
| JP | 2008-058654 A | 3/2008 |
| JP | 2008-058661 A | 3/2008 |
| JP | 2009-092817 A | 4/2009 |

(Continued)

OTHER PUBLICATIONS

International Search Report for PCT/JP2016/053119 (PCT/ISA/210) dated Apr. 5, 2016.

(Continued)

*Primary Examiner* — Ryan Howard
(74) *Attorney, Agent, or Firm* — Birch, Stewart, Kolasch & Birch, LLP

(57) ABSTRACT

In a case where an image forming panel is disposed to be shifted with respect to an optical axis of a projection lens having a lens barrel holding the lens, in the lens barrel, the increase in temperature in a first part on a side to which the image forming panel is shifted is larger than that in a second part on an opposite side. A temperature adjustment section includes a cooling duct, a heating duct, a connecting duct, and blowers 27 and. Air, which is suctioned from an inlet of the cooling duct, is passed through the first part, a light source, and the second part, sequentially by the blowers. The air cools down the first part, and heats the second part. Thereby, the temperature distribution in the circumferential direction of the lens barrel becomes uniform, and deterioration of the projected image is suppressed.

20 Claims, 9 Drawing Sheets

(56) References Cited

FOREIGN PATENT DOCUMENTS

| JP | 2010-243542 A | 10/2010 |
| JP | 2011-209393 A | 10/2011 |
| JP | 2011-209394 A | 10/2011 |

OTHER PUBLICATIONS

Written Opinion of the International Searching Authority for PCT/JP2016/053119 (PCT/ISA/237) dated Apr. 5, 2016.

PROJECTOR AND METHOD OF PREVENTING IMAGE DETERIORATION THEREOF

CROSS-REFERENCE TO RELATED APPLICATIONS

This application is a Continuation of PCT International Application No. PCT/JP2016/053119 filed on Feb. 3, 2016, which claims priority under 35 U.S.C § 119(a) to Japanese Patent Application No. 2015-071424 filed on Mar. 31, 2015. Each of the above application(s) is hereby expressly incorporated by reference, in its entirety, into the present application.

BACKGROUND OF THE INVENTION

1. Field of the Invention

The present invention relates to a projector, and particularly relates to a projector, in which an image forming panel is fixed in a state where the panel is shifted, and a method of preventing image deterioration thereof.

2. Description of the Related Art

Projectors modulate light, which is emitted from a light source device, in accordance with image information by an image forming panel (light modulation panel) so as to form image light, and project the formed image light onto a screen through a projection lens. For example, a liquid crystal display (LCD) or a digital micromirror device (DMD) is used as the image forming panel. Further, in the projectors, in order to improve image quality of the projected image, stops are arranged in the illumination optical system and the projection optical system, and rays not contributing to image formation are removed.

In recent projectors, due to improvement of various image forming panels and light sources such as LCDs and DMDs, an illuminance of the projected image has been increased as compared with the related art. An amount of heat generated by the high-intensity light source, which is used in the projector, is extremely large, and the temperatures of various components inside a casing tend to increase.

In the projector described in JP2005-331790A, immediately after power is turned on, a fan for cooling the light source blows air toward the projection lens, thereby transferring exhaust heat of the light source to the projection lens. As a result, a temperature of the projection lens is increased in advance, and focus movement of the projection lens caused by the temperature change in use is suppressed. Further, air is sent by fins provided on the lens holding frame to an aberration correction lens of the projection lens so as to cool the aberration correction lens (for example, refer to JP2010-243542A). Furthermore, a heating unit for heating a plurality of lens groups constituting the projection lens is provided so as to heat the entire projection lens and performs control to make the temperature thereof uniform, thereby eliminating fluctuation in focal position (for example, refer to JP2011-209394A).

SUMMARY OF THE INVENTION

In a case where the optical axis of the projection lens is perpendicular to a screen, an image, which is displayed on the image forming panel, is directly projected onto the screen in an enlarged manner. However, for example, in most cases of a table installation type projector, the screen is disposed above the projector. In particular, there is a merit that it is difficult for the presenter to shadow the front of the screen or the space saving. Thus, there is a demand for a wide-angle type projector in which the distance between the projector and the screen to be projected is set to be short. In such a projector, the image forming panel is disposed to be shifted in a direction opposite to a direction in which the screen is shifted with respect to the optical axis of the projection lens. The amount of shift of the image forming panel increases as an angle of view of the projection lens of the projector becomes wide.

In a case where the image forming panel is shifted in the direction perpendicular to the optical axis of the projection lens and image light is projected onto the screen, rays passing through the lens are deviated in the direction in which the image forming panel is shifted from the center of the optical axis of the projection lens. Therefore, the temperature increases at the position, at which the light passes, in the projection lens. Accordingly, in the lens barrel of the projection lens, temperature distribution is generated such that the temperature of the lens barrel on a side to which the image forming panel is shifted becomes relatively higher than the temperature of the lens barrel on the opposite side. Due to the uneven temperature distribution, a part of the lens barrel or a member holding the lens is deformed, and a plurality of lenses constituting the projection lens or a part of the lenses thereof is tilted or displaced. In a case where the lenses are tilted, the optical performance of the projection lens changes from the design value. Thus, this change may deteriorate the quality of the image projected onto the screen.

In JP2005-331790A, immediately after power is turned on, exhaust heat of the light source is transferred to the projection lens so as to increase the temperature of the projection lens, thereby suppressing an increase in temperature of the projection lens in use. Further, in JP2010-243542A, air is sent to the aberration correction lens of the projection lens, and the aberration correction lens is cooled, thereby suppressing an increase in temperature of the lens barrel. Furthermore, in JP2011-209394A, fluctuation in focal position is suppressed by heating the entire projection lens and performing control to make the temperature thereof uniform. However, in the case of suppressing the increase in temperature as in JP2005-331790A and JP2010-243542A, or in the case of heating the entire projection lens and performing control to make the temperature thereof uniform as in JP2011-209394A, there is no study about a temperature difference in the direction perpendicular to the optical axis of the projection lens. Thus, the tilt and the displacement of the lens are not suppressed, and the quality of the image projected onto the screen still deteriorates. Accordingly, new measures therefor have been desired.

The present invention has been made in consideration of such a situation, and its object is to provide a projector, which is capable of suppressing deterioration in quality of an image to be projected by eliminating uneven temperature distribution in a circumferential direction of a lens barrel as a direction perpendicular to an optical axis of a projection lens, and a method of preventing image deterioration of the projector.

In order to achieve the object, a projector of the present invention comprises: a light source; an image forming panel that modulates light, which is emitted from the light source, on the basis of image information so as to form image light; a projection lens that has a lens and a lens barrel holding the lens and projects image light which is formed by the image forming panel, where a center of the image forming panel is disposed to be shifted with respect to an optical axis of the projection lens.

The projector further comprises a cooling duct through which air for cooling a first part of the lens barrel on a side, to which the image forming panel is shifted with respect to the optical axis of the projection lens, passes.

The projector further comprises a heating duct through which air for heating a second part of the lens barrel on a side, which is opposite to the side to which the image forming panel is shifted with respect to the optical axis of the projection lens, passes.

The projector further comprises a connecting duct that connects the cooling duct and the heating duct, causes air from the cooling duct to pass through the light source, and sends the air to the heating duct.

The projector further comprises a blower that is mounted on any one of the cooling duct, the connecting duct, and the heating duct and sends at least a part of air suctioned from an inlet of the cooling duct to an outlet of the heating duct.

Further, exhaust from the outlet is sent to the second part so as to heat the second part. In addition, it is preferable that the cooling duct has a first opening portion that exposes the first part, and the heating duct has a second opening portion that exposes the second part.

Furthermore, it is preferable that the projector further comprises an air amount adjustment mechanism that adjusts an amount of air to be sent to the second part, between the connecting duct and the outlet. It is preferable that the lens barrel is made of synthetic resin. In addition, it is preferable that the first part and the second part are located to be closer to the image forming panel than a position of a stop which determines an F number of the projection lens.

Furthermore, it is preferable that in a case where a distance from the optical axis of the projection lens to the center of the image forming panel is Y, a length of the image forming panel in a shift direction is H, and an amount of shift of the image forming panel, which is obtained by dividing the distance Y by the length H, is set as S=Y/H, the amount of shift S is in a range of $0.4<S<0.7$.

Further, in order to achieve the object, according to the present invention, there is provided a method of preventing image deterioration of a projector. The projector includes a light source, an image forming panel that modulates light, which is emitted from the light source, on the basis of image information so as to form image light, a projection lens that has a lens and a lens barrel holding the lens and projects image light which is formed by the image forming panel, where a center of the image forming panel is disposed to be shifted with respect to an optical axis of the projection lens. The method comprises: connecting, through ducts, a first part of the lens barrel on a side to which the image forming panel is shifted with respect to the optical axis, the light source, and a second part of the lens barrel on a side which is opposite to the side to which the image forming panel is shifted with respect to the optical axis; and passing air, which is suctioned from an inlet of the duct close to the first part, through the ducts close to the first part, the light source, and the second part, sequentially, and sending air from an outlet of the duct, which close to the second part, to the second part, by a blower provided in the duct.

In addition, in order to achieve the object, according to the present invention, there is provided another method of preventing image deterioration of the projector. The method comprises: connecting, through ducts, a first part of the lens barrel on a side to which the image forming panel is shifted with respect to the optical axis, the light source, and a second part of the lens barrel on a side which is opposite to the side to which the image forming panel is shifted with respect to the optical axis; making the ducts have a first opening portion which exposes the first part and a second opening portion which exposes the second part; and passing air, which is suctioned from an inlet of the duct close to the first part of the lens barrel, through the first part, the light source, and the second part, sequentially, by the blower provided in the duct.

According to the projector of the present invention and the method of preventing image deterioration thereof, regarding the projector in which the center of the image forming panel is disposed to be shifted with respect to the optical axis of the projection lens, it is possible to suppress deterioration in quality of an image to be projected by uniformizing temperature distribution in the circumferential direction of the lens barrel as the direction perpendicular to the optical axis of the projection lens.

DESCRIPTION OF THE PREFERRED EMBODIMENTS

First Embodiment

Figure 1:
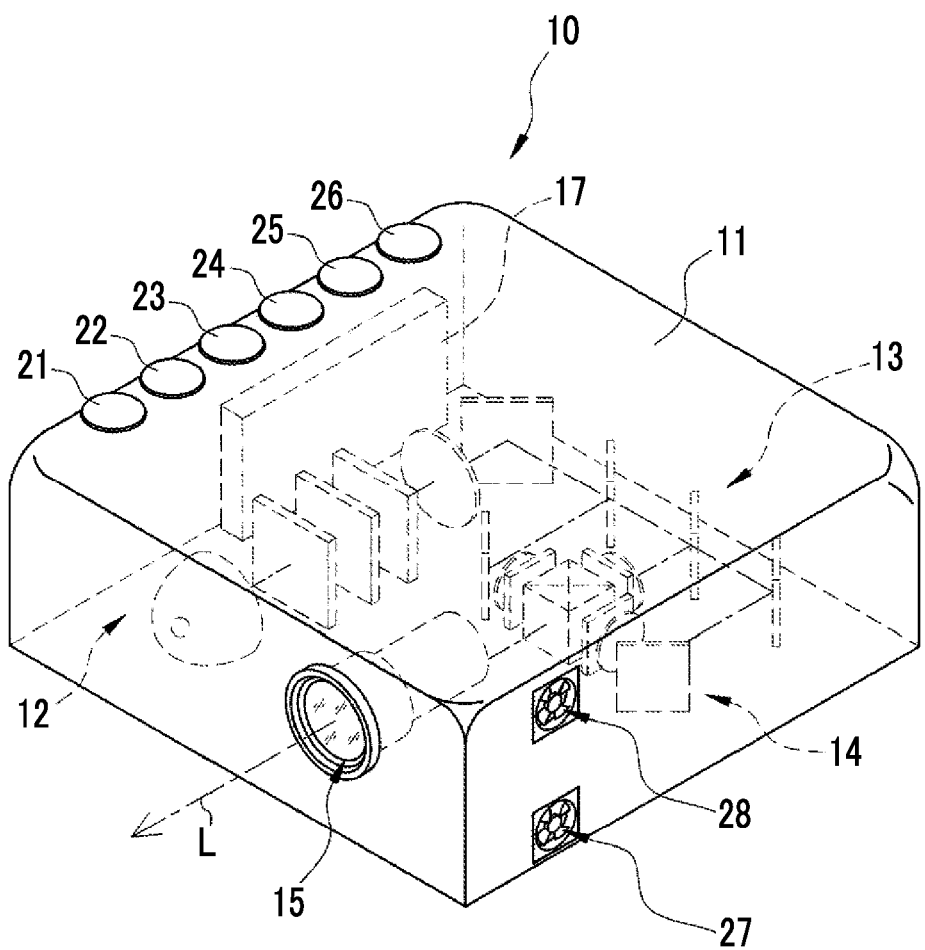
FIG. 1 is a perspective view schematically illustrating a configuration of a projector of the present invention.

As shown in FIG. 1, in a projector 10 of the present embodiment, a casing 11, which has a substantially rectangular parallelepiped shape, houses a light source section 12, a color separation section 13, an image forming section 14, a projection lens 15, a temperature adjustment section 16 (refer to FIG. 2), and a control section 17. A zoom dial 21, a light amount adjustment dial 22, a focus dial 23, a vertical focus adjustment dial 24, a horizontal focus adjustment dial 25, and a screen adjustment dial 26 are provided on the casing 11. Blowers 27 and 28 are provided on the side surface of the casing 11. Further, in the following embodiment, a situation, in which the projector is installed on a board such as a table, will be described as an example.

Figure 2:
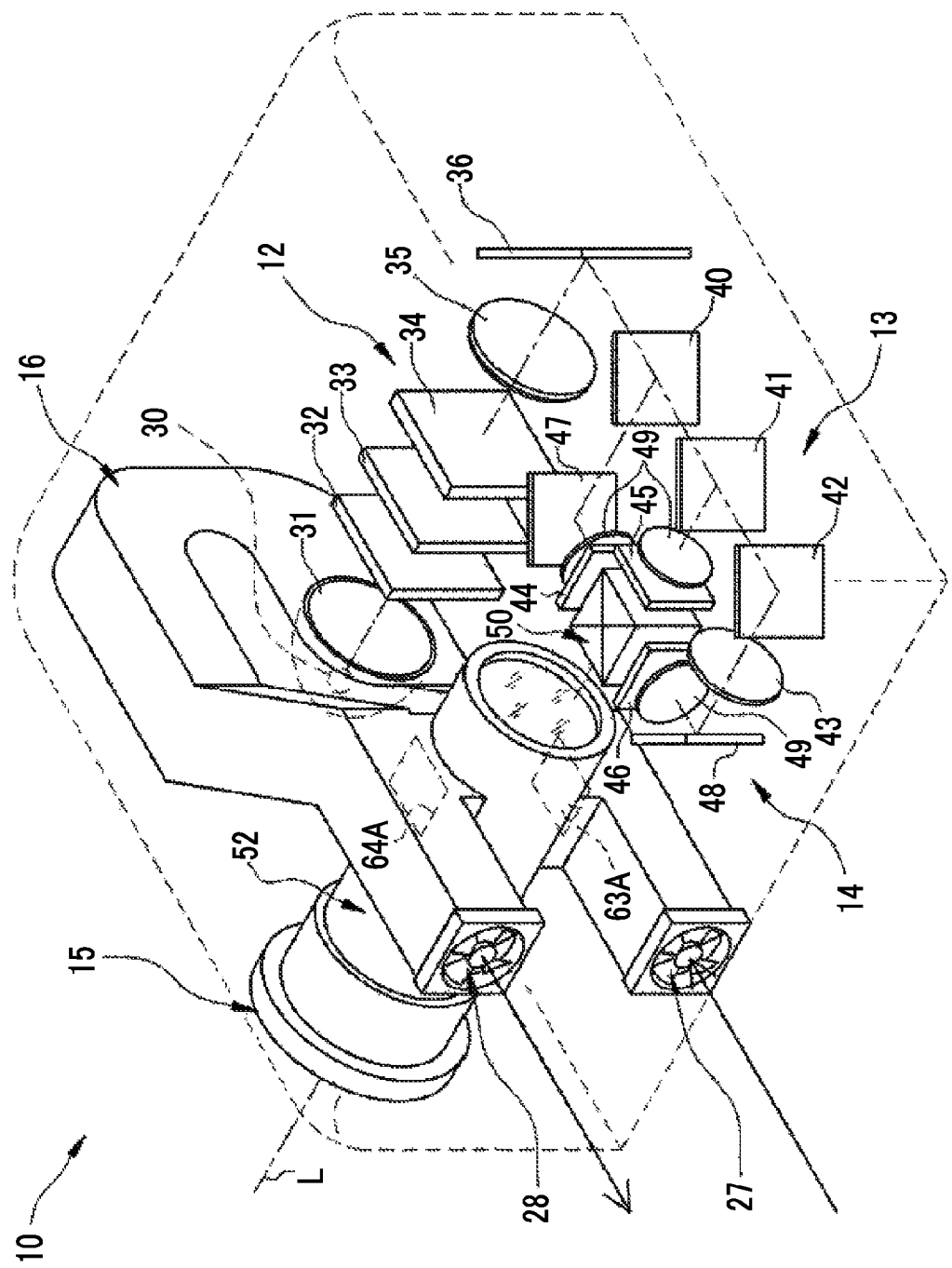
FIG. 2 is a perspective view illustrating an internal configuration of a projector of a first embodiment.

As shown in FIG. 2, the light source section 12 comprises a light source 30 which emits light, and supplies the light of the light source 30 to the color separation section 13. The color separation section 13 separates the light, which is emitted from the light source section 12, into light beams with three colors such as red, green, and blue. The light beams with three colors such as red, green, and blue separated by the color separation section 13 are modulated to form an image by the image forming section 14, and are emitted from the projection lens 15. Then, the light beams are projected onto a screen (not shown in FIGS. 1 to 3, and indicated by a reference numeral of 20 in FIG. 4).

Figure 3:
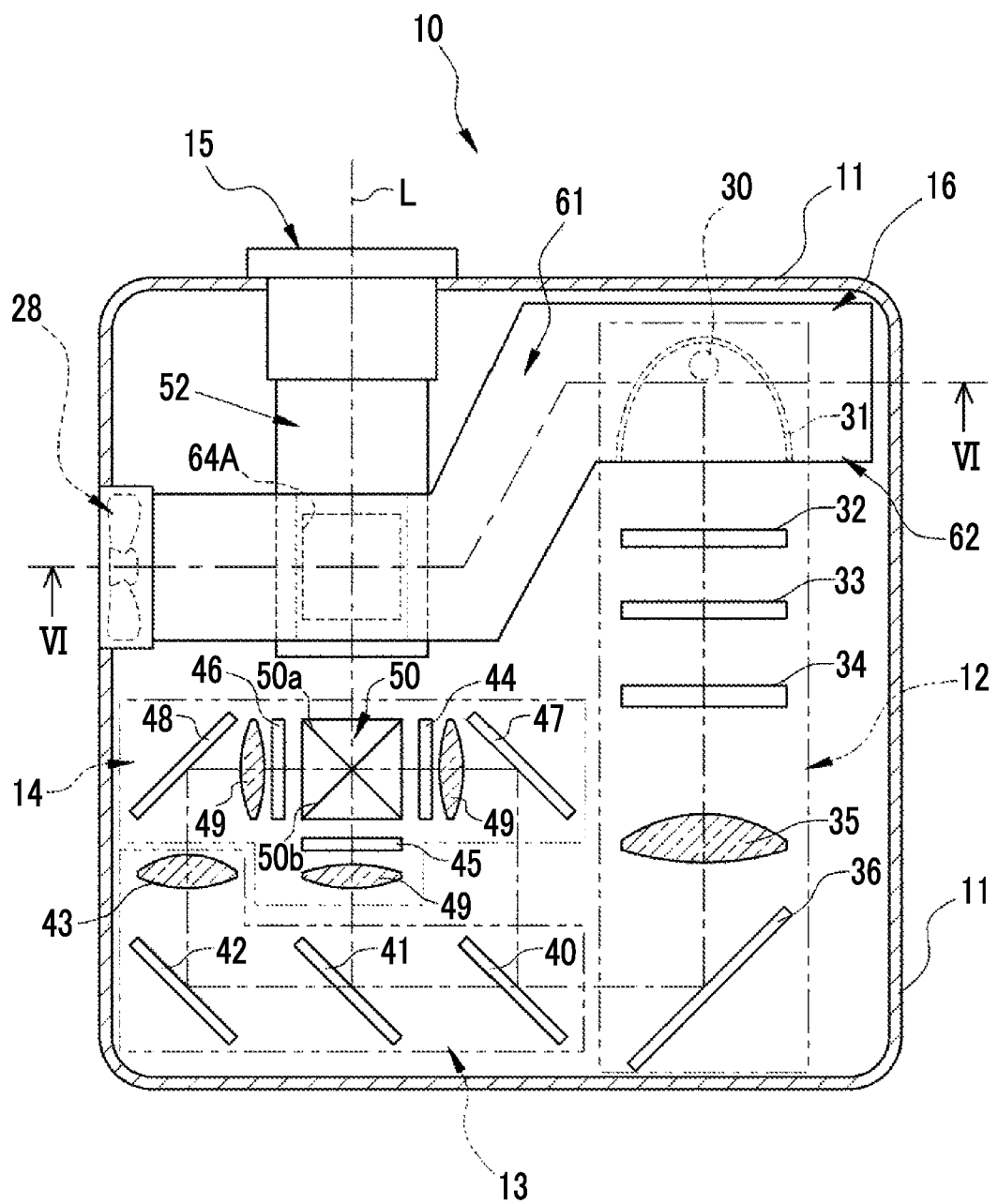
FIG. 3 is a horizontal cross-sectional view illustrating the internal configuration of the projector of the first embodiment.

As shown in FIG. 3, the light source section 12 includes a light source 30, a reflector 31, fly-eye lenses 32 and 33, a polarization conversion element 34, a condenser lens 35, a reflection mirror 36, and the like. The light source 30 is a high-intensity lamp such as a xenon lamp, a metal halide lamp, an extra-high pressure mercury lamp, or the like, and emits natural white light having no specific polarization direction. The reflector 31 condenses irradiation light emitted by the light source 30.

The fly-eye lenses 32 and 33 include a micro lens array and the like, uniformize light amount distribution within an irradiated surface of the irradiation light emitted by the light source 30 and the irradiation light condensed by the reflector 31, and cause the light onto the polarization conversion element 34.

The polarization conversion element 34 aligns the polarization directions of the incident irradiation light. The condenser lens 35 causes the irradiation light, of which the polarization directions are aligned by the polarization conversion element 34, to be incident onto the reflection mirror 36. The reflection mirror 36 reflects the incident irradiation light, changes the propagation direction, and causes the light to be incident into the color separation section 13. Thereby, the irradiation light is supplied from the light source section 12 to the color separation section 13.

The color separation section 13 comprises two dichroic mirrors 40 and 41, a reflection mirror 42, and a relay lens 43. The color separation section 13 separates the irradiation light, which is emitted from the light source section 12, into light beams with three colors such as red (R), green (G), and blue (B) by using the dichroic mirrors 40 and 41.

The dichroic mirror 40 is disposed such that the irradiation light supplied from the light source section 12 is incident thereon. Further, the dichroic mirror 40 is formed in a substantially plate shape, and is provided so as to be tilted by approximately 45 degrees with respect to the optical axis of the irradiation light. The dichroic mirror 40 has a characteristic of reflecting the red light and transmitting the green light and the blue light, reflects only a red light component in the irradiation light which is white light, and transmits a green light component and a blue light component.

The red light reflected by the dichroic mirror 40 is incident on the image forming section 14. On the other hand, the green light and the blue light, which are transmitted through the dichroic mirror 40, are incident onto the dichroic mirror 41.

In a manner similar to that of the dichroic mirror 40, the dichroic mirror 41 is formed in a substantially plate shape, and is provided so as to be tilted by approximately 45 degrees with respect to the optical axis of the irradiation light. The dichroic mirror 41 has a characteristic of reflecting the green light and transmitting the blue light, reflects only a green light component in the irradiation light of green and blue light components transmitted through the dichroic mirror 40, and transmits a blue light component.

The green light reflected by the dichroic mirror 41 is incident on the image forming section 14. On the other hand, the blue light, which is transmitted through the dichroic mirror 41, is incident onto the reflection mirror 42. In a manner similar to that of the dichroic mirrors 40 and 41, the reflection mirror 42 is formed in a substantially plate shape, and is provided so as to be tilted by approximately 45 degrees with respect to the optical axis of the irradiation light. The blue light, which is reflected by the reflection mirror 42, is guided to the relay lens 43, and is incident into the image forming section 14.

The image forming section 14 includes a red light image forming panel 44, a green light image forming panel 45, a blue light image forming panel 46, reflection mirrors 47 and 48, a condensing lens 49, a cross dichroic prism 50, and the like.

Among the three color light beams separated by the dichroic mirrors 40 and 41, the red light is incident into the red light image forming panel 44 through the reflection mirror 47 and the condensing lens 49, the green light is incident into the green light image forming panel 45 through the condensing lens 49, and the blue light is incident into the blue light image forming panel 46 through the reflection mirror 48 and the condensing lens 49.

The red light image forming panel 44 is, for example, a transmissive LCD, and is disposed between the condensing lens 49 and the cross dichroic prism 50. The red light image forming panel 44 modulates the red light transmitted therethrough so as to generate red image light to which image information of the red component is added, and causes the red image light to be incident into the cross dichroic prism 50.

The green light image forming panel 45 is configured similarly to the red light image forming panel 44, and modulates the transmitted green light so as to generate green image light to which image information of the green color component is added, and causes the green image light to be incident into the cross dichroic prism 50. Further, the blue light image forming panel 46 is also configured in the same manner as the red light image forming panel 44, and modulates the transmitted blue light so as to generate the blue image light to which the image information of the blue color component is added, and causes the blue image light to be incident into the cross dichroic prism 50.

The cross dichroic prism 50 is formed in a substantially cubic shape by using a transparent material such as glass, and has dichroic surfaces 50a and 50b which intersect with each other. The dichroic surface 50a has a characteristic of reflecting the red light and transmitting the green light and the blue light. The dichroic surface 50b has a characteristic of reflecting the blue light and transmitting the red light and the green light. The red image light, which is incident on the cross dichroic prism 50, is reflected by the dichroic surface 50a, and is incident into the projection lens 15. The green image light is transmitted through the dichroic surfaces 50a and 50b, and is incident into the projection lens 15. Then, the blue image light is reflected by the dichroic surface 50b, and is incident into the projection lens 15.

In such a manner, the cross dichroic prism 50 makes incident image light of each color incident on the projection lens 15 as combined image light that is grouped on the same optical axis. Thereby, the synthetic image light, to which the image information of each of the colors such as red, green, and blue is added, is projected by the projection lens 15, and a full-color image is displayed on the screen or the like.

The control section 17 performs control to display images of three colors such as RGB, on the image forming panels 44 to 46. Further, the control section 17 also performs the following processing. For example, in a case of receiving an operation signal of the zoom dial 21, a size of the image projected onto the screen 20 is adjusted. In a case of receiving an operation signal of the light amount adjustment dial 22, a brightness of the image projected onto the screen 20 is adjusted. In a case of receiving an operation signal of the focus dial 23, a focus adjustment mechanism (not shown) of the projection lens 15 is operated to adjust the focus of the central portion of the image projected onto the screen 20. In a case of receiving an operation signal of the vertical focus adjustment dial 24, a first motor of an attitude adjustment device (not shown) is rotated. Thereby, the projection lens 15 is rotated about a horizontal axis perpendicular to the optical axis, and the tilt of the projection lens 15 in the vertical direction is adjusted. In a case of receiving an operation signal of the horizontal focus adjustment dial 25, the second motor of the posture adjustment device is rotated. Thereby, the projection lens 15 is rotated about the vertical axis orthogonal to the optical axis, and the tilt of the projection lens 15 in the horizontal direction is adjusted. In a case of receiving an operation signal of the screen adjustment dial 26, display sizes and shapes of the images formed on the image forming surfaces of the image forming panels 44 to 46 are changed. For example, the display sizes and shapes are changed such that the rectangular image is not displayed as a trapezoidal image in accordance with the tilt angle of the projection lens 15.

Figure 4:
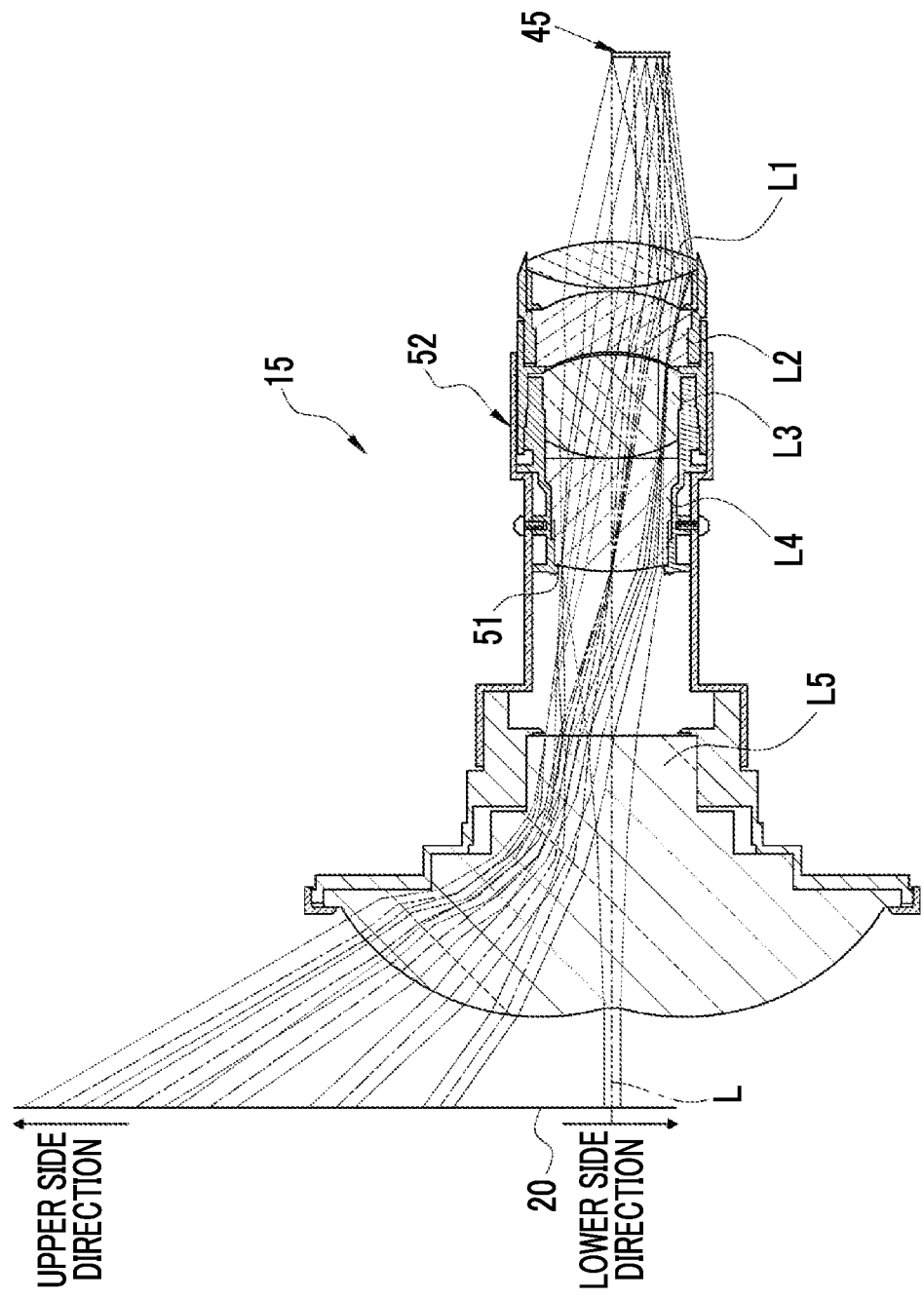
FIG. 4 is a vertical cross-sectional view illustrating the configuration of the projection lens.
Figure 5:
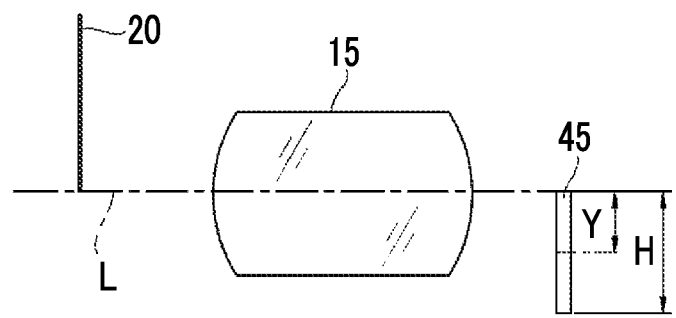
FIG. 5 is a diagram illustrating an amount of shift of an image forming panel.

As shown in FIG. 4, the images are projected upward onto the screen 20 with respect to an optical axis L of the projection lens 15. The centers of the image forming panels 44 to 46 are fixed in a state where the centers are shifted downward with respect to the optical axis L of the projection lens 15, that is, in a direction opposite to the direction in which the central position of the projected image (projection surface of the screen 20) is deviated with respect to the optical axis L of the projection lens 15. In FIGS. 4 and 5, only the image forming panel 45 among the image forming panels 44 to 46 is shown in order to avoid complication.

The amount of shift of image forming panels 44 to 46 will be described with respect to FIG. 5. Assuming that distances from the optical axis L of the projection lens 15 to the centers of the image forming panels 44 to 46 are Y and lengths of the image forming panels 44 to 46 in the shift direction are H, amounts of shift S (shift amounts) of the image forming panels 44 to 46 are calculated by dividing the distance Y by the length H. That is, the amounts of shift of the image forming panels 44 to 46 are defined by the following expression: amount of shift S=Y/H. That is, in a case where S=0.5, as shown in FIG. 5, the end face closer to the optical axis L of the image forming panels 44 to 46 coincides with the optical axis L of the projection lens 15. Further, in a case where S>0.5 (S is larger than 0.5), the end face closer to the optical axis L of the image forming panels 44 to 46 is shifted in a direction of separation from the optical axis L of the projection lens 15. In a case where S=0, the centers of the image forming panels 44 to 46 coincide with the optical axis L of the projection lens 15, and thus the arrangement is similar to that of the conventional long distance projection type.

It is preferable that the amount of shift S of each of the image forming panels 44 to 46 is greater than 0.4 and less than 0.7. In a case where the amount of shift S is greater than 0.4, the effect of the temperature distribution in the direction perpendicular to the optical axis of the projection lens becomes ignorable as compared with the case where the amount is equal to or less than 0.4. On the other hand, in a case where the amount of shift S is less than 0.7, the amount of shift of each of the image forming panels 44 to 46 does not become extremely larger than that in the case where the amount is equal to or greater than 0.7. Thus, an increase in size of the lens system is suppressed, thereby preventing deterioration of manufacturing suitability. Therefore, by setting the amount of shift S of each of the image forming panels 44 to 46 within the above range, it is possible to provide a product having high performance while reducing the effect of the temperature distribution in the direction perpendicular to the optical axis of the projection lens 15. It is more preferable that the amount of shift S of each of the image forming panels 44 to 46 is greater than 0.45 and less than 0.6.

As shown in FIG. 4, the projection lens 15 comprises a lens barrel 52 that holds first to fifth lenses L1 to L5 and an aperture stop 51 arranged in order from the image forming panels 44 to 46. The first lens L1 has convex surfaces on both sides, and the second lens L2 has a concave surface on a screen 20 side and has a convex surface on a side of the image forming panels 44 to 46. The third lens L3 has convex surfaces on both sides, and the fourth lens L4 has a convex surface on the screen 20 side and has a planar surface on the side of the image forming panels 44 to 46. The fifth lens L5 has an aspheric surface convex on the screen 20 side and has a planar surface on the side of the image forming panels 44 to 46.

The lens barrel 52 has a complicated cross-sectional shape, and is thus formed of synthetic resin such as polycarbonate. It should be noted that a part or the whole of the lens barrel 52 may be made of metal.

The aperture stop 51, which has a circular shape and has an F number, is provided on the exit surface side of the fourth lens L4, and the position of the aperture stop 51 is the stop position. The passage path of the light, which passes the respective positions of the image forming panels 44 to 46, in the projection lens 15 is schematically indicated by a solid line, and the center of the light is indicated by the chain line.

In a case where the image forming panels 44 to 46 are disposed to be shifted downward, the light, which is incident into the projection lens 15, passes mostly through the lower side with respect to the optical axis L of the projection lens 15, that is, in a direction in which the image forming panels 44 to 46 within the projection lens 15 is shifted, to the position of the stop within the projection lens 15. Then, the passage path of the light is reversed at the position of the stop, and the light passes mostly through the upper side of the projection lens 15, and is projected onto the screen 20. Accordingly, the projection lens on the side, to which the image forming panels 44 to 46 are shifted, is heated by passage of light, and temperature distribution occurs in the projection lens 15 in a direction perpendicular to the optical axis of the projection lens 15.

In a case where a temperature difference thereof is large, the lens barrel 52, which holds the first to fifth lenses L1 to L5, is also deformed by heating on only one side thereof. Due to the deformation, the first to fifth lenses L1 to L5 are tilted, and the quality of the image projected onto the screen deteriorates. Furthermore, the rotational symmetry of the first to fifth lenses L1 to L5 is destroyed by the tilt of the first to fifth lenses L1 to L5. Therefore, not only deterioration in resolving power of the entire projected image but also deviation in focus position in the diagonal direction due to occurrence of the field curvature and the like occur. This leads to deterioration in performance of the entire projected image.

As described above, in the lens barrel 52, the increase in temperature is large in the first part 52A (refer to FIG. 6) on the side, to which the image forming panels 44 to 46 are shifted with respect to the optical axis L of the projection lens 15, and the increase in temperature is small in the second part 52B (refer to FIG. 6) on the side opposite to the side to which the image forming panels 44 to 46 are shifted with respect to the optical axis L of the projection lens 15. Therefore, the temperature adjustment section 16 has a function of cooling the first part 52A and heating the second part 52B.

Figure 6:
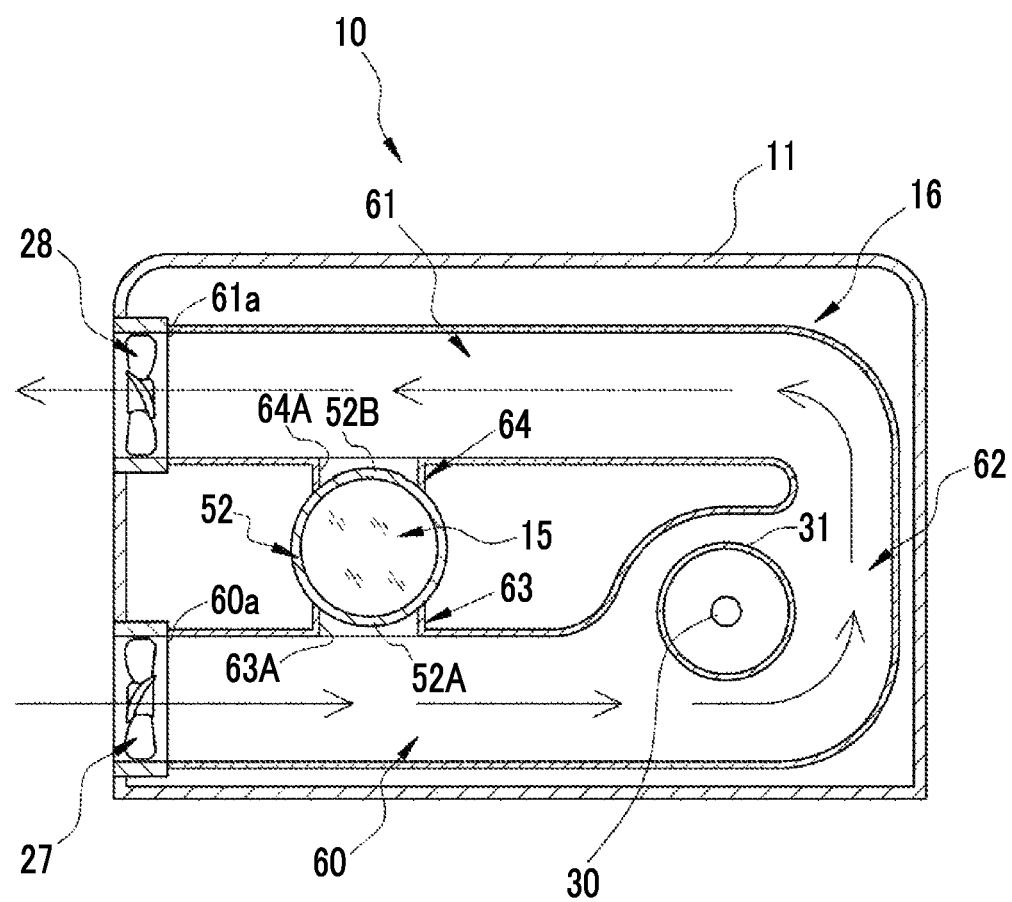
FIG. 6 is a cross-sectional view taken along the line VI-VI of FIG. 3.

As shown in FIG. 6, the temperature adjustment section 16 comprises a cooling duct 60, a heating duct 61, a connecting duct 62, and the blowers 27 and 28. It is preferable that the first part 52A to be cooled and the second part 52B to be heated by the temperature adjustment section 16 are located to be closer to the image forming panels 44 to 46 than the position of the aperture stop 51.

The cooling duct 60 is formed in a tubular shape which has a quadrilateral cross section, in which the blower 27 is mounted on an inlet 60a positioned at one end thereof, and of which the other end extends toward the light source 30. The heating duct 61 is formed in a tubular shape which has a quadrangular cross section, in which the blower 28 is mounted on an outlet 61a positioned at one end thereof, and of which the other end extends toward the light source 30. The heating duct 61 is disposed in parallel to the cooling duct 60. The ducts 60 to 62 are formed of synthetic resin as in the lens barrel 52, for example.

The blower 27 is an intake fan which suctions air to the cooling duct 60 through the inlet 60a, and the blower 28 is an exhaust fan which exhausts air from the heating duct 61 through the outlet 61a. For example, the blowers 27 and 28 are attached such that orientations thereof are changed for the casing 11 by using the same propeller fans. The blower 27 is positioned below the projection lens 15 in the vertical direction and the blower 28 is positioned above the projection lens 15 in the vertical direction.

The air, which is suctioned from the inlet 60a by the blower 27, is sent to the light source 30 through the cooling duct 60. The cooling duct 60 has a connection portion 63 that faces the first part 52A of the lens barrel 52. An end edge of the connection portion 63 is formed in an arc shape along the outer peripheral surface of the first part 52A, and has a first opening portion 63A which exposes the first part 52A to the cooling duct 60 and is for communication with the inside of the cooling duct 60. A part of the air, which is sent into the cooling duct 60, is sent to the first part 52A through the first opening portion 63A.

The blower 28 discharges air, which passes through the heating duct 61, from the outlet 61a to the outside of the casing 11. The heating duct 61 has a connection portion 64 which faces the second part 52B of the lens barrel 52. An end edge of the connection portion 64 is formed in an arc shape along the outer peripheral surface of the second part 52B, and has a second opening portion 64A which exposes the second part 52B to the heating duct 61 and is for communication with the inside of the heating duct 61.

The connecting duct 62 is formed in a tubular shape which connects the other end of the cooling duct 60 and the other end of the heating duct 61 and is curved in a U shape. The connecting duct 62 is disposed in the vicinities of the light source 30 and the reflector 31, and a surface thereof, from which the illumination light is emitted from the reflector 31, is opened. The connecting duct 62 passes the air, which is sent from the cooling duct 60, to the light source 30, and sends the air to the heating duct 61. Since the light source 30 emits heat to the surroundings, the air, which is sent from the cooling duct 60, is heated by being passed through the light source 30, and is sent to the heating duct 61.

As described above, in the temperature adjustment section 16, the blowers 27 and 28 passes the air, which is suctioned from the inlet 60a of the cooling duct 60, sequentially through the first part 52A, the light source 30, and the second part 52B. Since the air passing through the cooling duct 60 is suctioned from the outside of the casing 11 by the blower 27, a temperature thereof is lower than that of the air in the casing 11. Therefore, the air, which is sent from the cooling duct 60 to the first part 52A through the first opening portion 63A, is able to cool the first part 52A. On the other hand, since the air passing through the heating duct 61 is heated by the light source 30, a temperature thereof is higher than that of the air passing through the cooling duct 60. Accordingly, the air, which is sent from the heating duct 61 to the second part 52B through the second opening portion 64A, is able to heat the second part 52B.

By cooling the first part 52A and heating the second part 52B, the temperature distribution in the circumferential direction of the lens barrel 52 of the projection lens 15 becomes uniform, and a part of the lens barrels 52 is prevented from being deformed by the uneven temperature distribution. In particular, it is possible to reduce the temperature difference between the lower side (the first part 52A) of the lens barrel 52, of which the temperature increases due to the passage of light, and the upper side (the second part 52B) as the side opposite to the lower side of the lens barrel 52. Thus, the first to fifth lenses L1 to L5 within the projection lens 15 are prevented from being tilted. In such a manner, in the present invention, the method of preventing image deterioration is performed.

Second Embodiment

Figure 7:
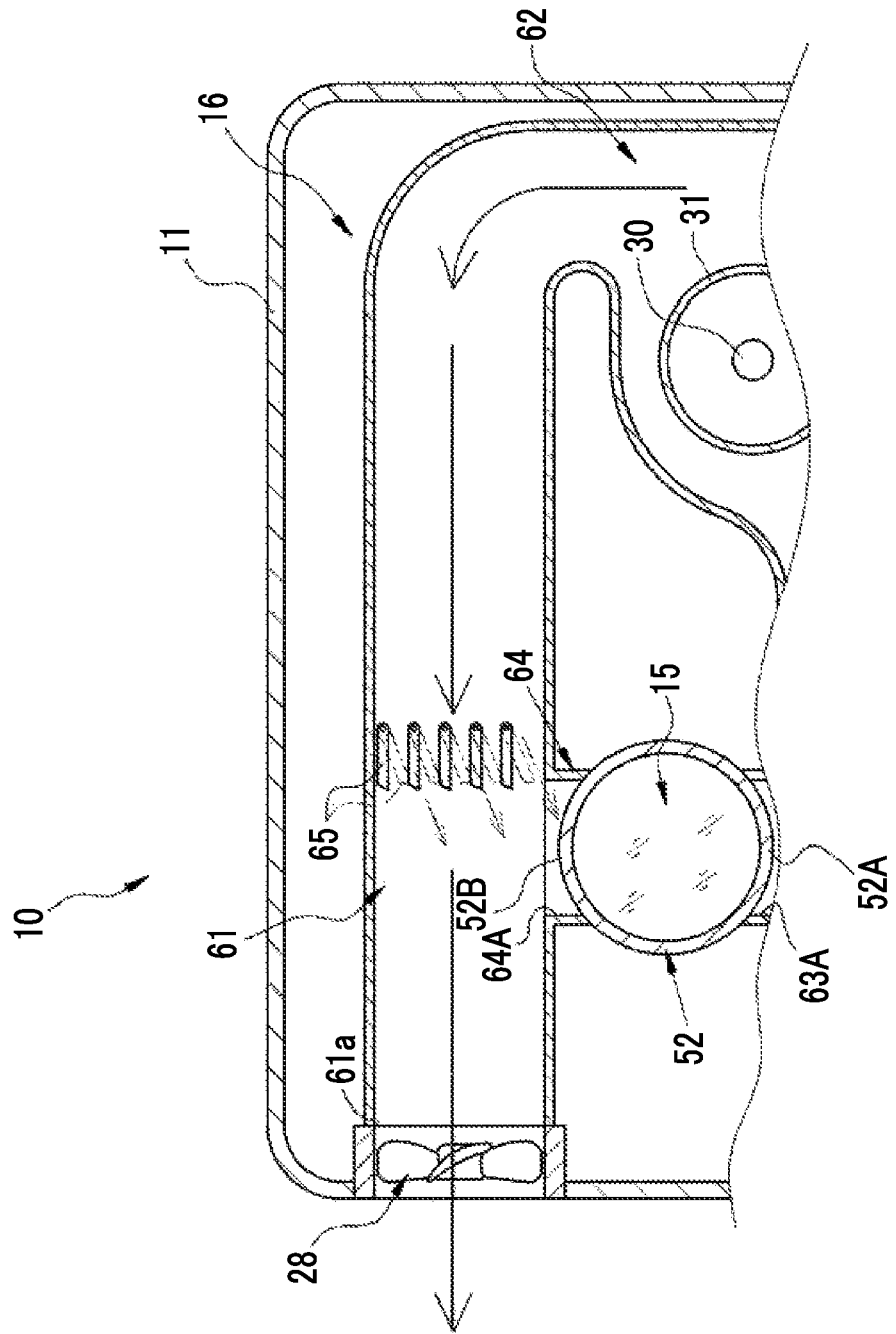
FIG. 7 is a cross-sectional view illustrating a configuration of an air amount adjustment mechanism of a second embodiment.

In the first embodiment, a part of the heated air passing through the heating duct 61 passes through the second opening portion 64A and is sent to the second part 52B. In a second embodiment shown in FIG. 7, in order to more effectively send the heated air to the second part 52B, the amount of air adjusting mechanism, which adjusts an amount of air to be sent to the second part 52B, is provided. In this case, the air amount adjustment mechanism is, for example, a louver mechanism that comprises a plurality of rectifying fins 65.

The plurality of rectifying fins 65 are arranged in parallel to each other inside the heating duct 61 and between the connecting duct 62 and the second part 52B. The rectifying fins 65 are provided to be swingable between a first position (a position indicated by the solid line) at which the fins are parallel to the direction of the cylinder center of the heating duct 61 and a second position (a position indicated by the chain double-dashed line) at which the fins are inclined to those at the first position and the leading ends thereof are oriented to the second part 52B. The rectifying fins 65 at the first position guide the air within the heating duct 61 to the outlet 61a, and the rectifying fins 65 at the second position guide the air within the heating duct 61 to the second part 52B. In the example shown in FIG. 7, the rectifying fins 65 are disposed between the connecting duct 62 and the second part 52B. However, the present invention is not limited thereto, and the rectifying fins 65 may be disposed between the connecting duct 62 and the outlet 61a.

Figure 8:
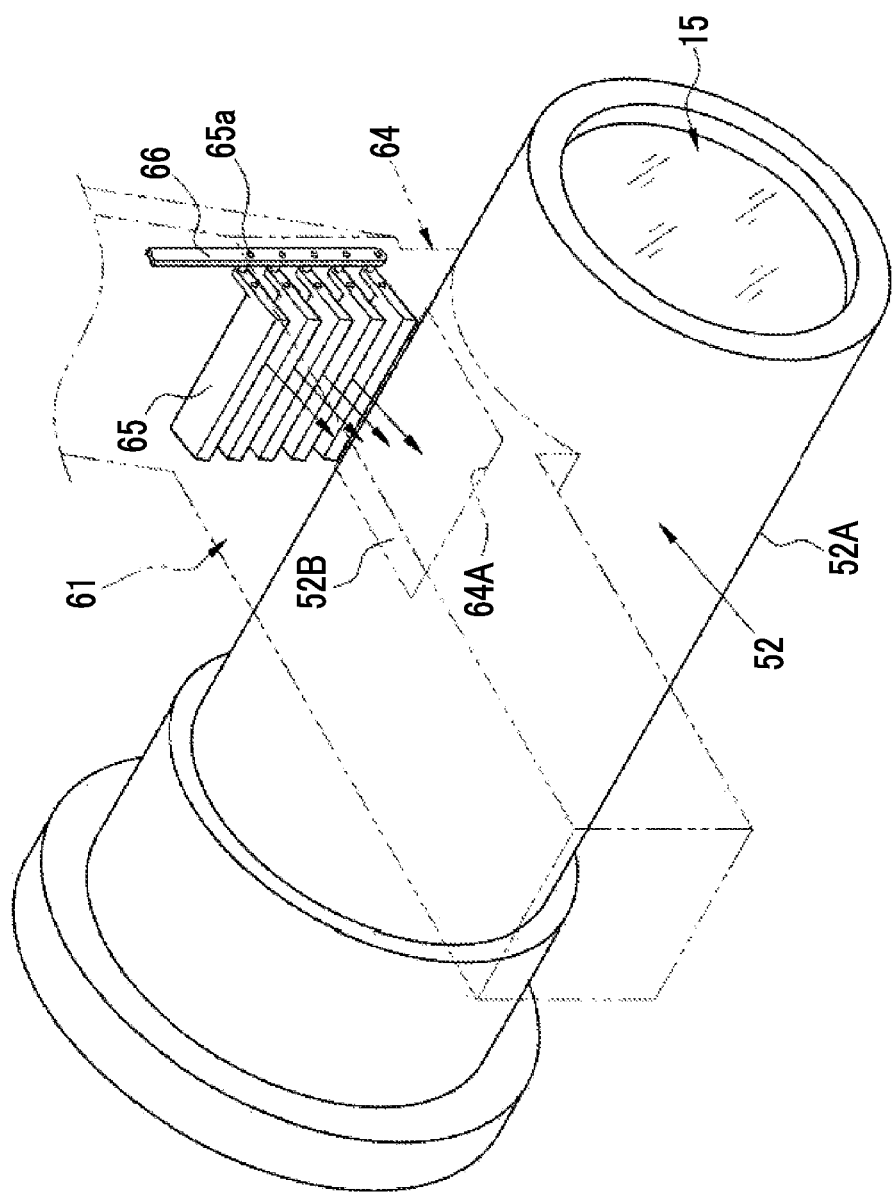
FIG. 8 is a perspective view illustrating the configuration of the air amount adjustment mechanism of the second embodiment.

As shown in FIG. 8, for example, the plurality of rectifying fins 65 are connected to a link rod 66 through connection pins 65a formed at one end, and the link rod 66 is provided to be slidable with respect to the heating duct 61. The air amount adjustment mechanism of the present embodiment comprises, for example, a temperature sensor that detects the temperatures of the first part 52A and the second part 52B, and a driving section (not shown in the drawing together) that drives the link rod 66 to move the rectifying fins 65 between the first position and the second position. The air amount adjustment mechanism adjusts the amount of air by controlling the driving section on the basis of the temperature difference between the first part 52A and the second part 52B detected by the temperature sensor. For example, the driving section sets the rectifying fins 65 to the first position in a case where the temperature difference between the first part 52A and the second part 52B exceeds a certain range, and sets the fins to the second position in a case where the temperature difference is within the certain range. Thereby, it is possible to adjust the amount of air which is sent from the heating duct 61 to the second part 52B.

It should be noted that the present invention is not limited to the configuration in which the rectifying fins 65 are automatically moved as described above. For example, in a case where the link rod 66 is made to slide by manually operating the operation lever provided in the casing 11, driving force thereof may be transferred to the rectifying fins 65, and thereby the rectifying fins 65 may move between the first position and the second position.

Third Embodiment

Figure 9:
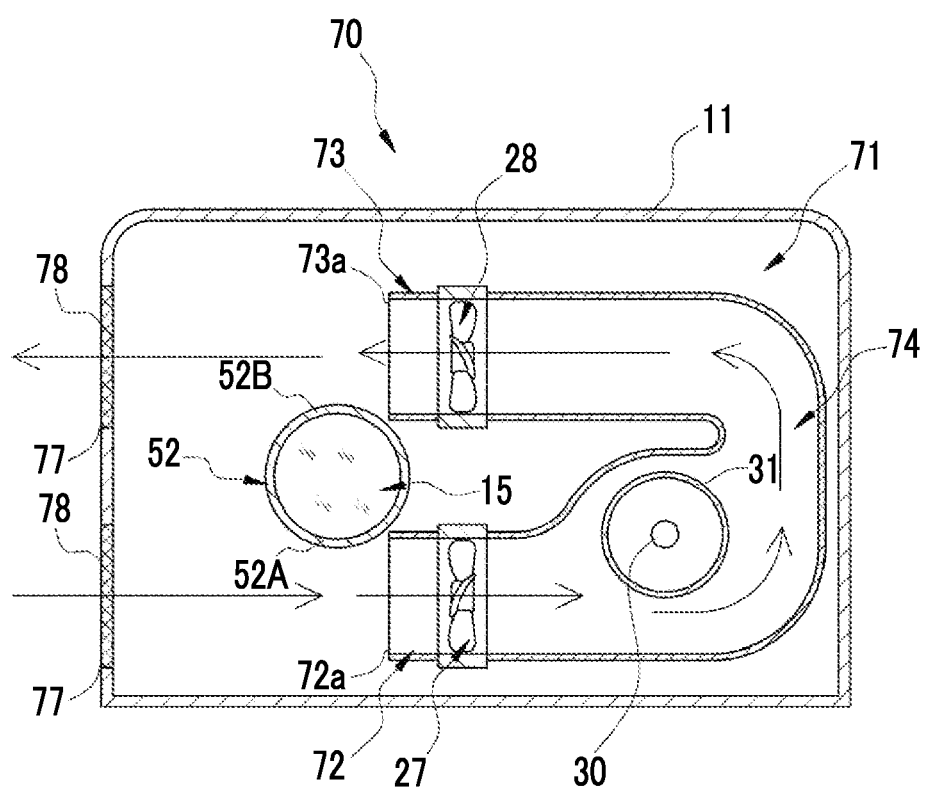
FIG. 9 is a cross-sectional view illustrating configurations of a duct and a blower of a third embodiment.

In the first and second embodiments, the blowers 27 and 28 are mounted on the inlet 60a of the cooling duct 60 and the outlet 61a of the heating duct 61, air is suctioned from the outside of the casing 11 so as to cool the lens barrel 52, and the heated air is discharged to the outside of the casing 11. In the third embodiment shown in FIG. 9, the inlet 72a of the cooling duct 72 and the outlet 73a of the heating duct 73 are disposed in the casing 11, and the lens barrel 52 is heated by the air discharged from the outlet 73a. In the third embodiment, the same parts and members as those of the first and second embodiments are denoted by the same reference numerals, and the description thereof is omitted, and the differences from the first embodiment will be mainly described.

The temperature adjustment section 71 constituting the projector 70 of the present embodiment comprises a cooling duct 72, a heating duct 73, a connecting duct 74, and blowers 27 and 28. Further, instead of the blowers 27 and 28 in the first embodiment, meshes 77 are provided on the side surface of the casing 11. The meshes 77 cover the opening portions 78 formed in the casing 11. It should be noted that the members covering the opening portions 78 are not limited to the meshes 77, and for example, a plurality of fins may be attached instead.

The cooling duct 72 is formed in a tubular shape which has a quadrangular cross section, in which an inlet 72a positioned at one end thereof faces the first part 52A of the lens barrel 52, and of which the other end extends toward the light source 30. The blower 27 is mounted on the cooling duct 72 between the inlet 72a and the light source 30. The air, which is suctioned from the inlet 72a by the blower 27, is sent to the light source 30 through the cooling duct 72. The meshes 77 and the opening portions 78 are arranged on the side surface of the casing 11 at a position where the cooling duct 72 extends from the inlet 72a to the side surface of the casing 11.

The heating duct 73 is formed in a tubular shape which has a quadrangular cross section, in which an outlet 73a positioned at one end thereof faces the second part 52B of the lens barrel 52, and of which the other end extends toward the light source 30. The blower 28 is mounted on the heating duct 73 between the outlet 73a and the light source 30. The blower 28 discharges air, which passes through the heating duct 73, from the outlet 73a, and sends the air to the second part 52B. The heating duct 73 is disposed in parallel to the cooling duct 72. The meshes 77 and the opening portions 78 are arranged on the side surface of the casing 11 at a position where the heating duct 73 extends from the outlet 73a to the side surface of the casing 11.

The connecting duct 74 is formed in a tubular shape which connects the other end of the cooling duct 72 and the other end of the heating duct 73 and is curved in a U shape. As in the connecting duct 62 of the first embodiment, the connecting duct 74 is disposed in the vicinities of the light source 30 and the reflector 31, and passes the air, which is sent from the cooling duct 72, to the light source 30, and sends the air to the heating duct 73.

As described above, in the temperature adjustment section 71, the blowers 27 and 28 passes the air, which is suctioned from the inlet 72a of the cooling duct 72, sequentially through the first part 52A, the light source 30, and the heating duct 73 on the second part 52B side, and sends the air from the outlet 73a of the heating duct 73 to the second part 52B. By suctioning the air from the inlet 72a to the cooling duct 72, the air in the vicinity of the first part 52A is suctioned. Since the outside air is sent into the casing 11 through the mesh 77 and the opening portion 78, it is possible to cool the first part 52A. On the other hand, since the air passing through the heating duct 73 is heated by the light source 30, a temperature thereof is higher than that of the air passing through the cooling duct 72. Accordingly, the air, which is sent from the heating duct 61 to the second part 52B through the outlet 73a, is able to heat the second part 52B.

Also in the temperature adjustment section 71 of this embodiment, as in the second embodiment, the air amount adjustment mechanism, which adjusts the amount of air to be sent to the second section 52B, may be provided. In this case, as in the second embodiment, it is preferable to provide a louver mechanism that comprises the plurality of rectifying fins 65 in the outlet 73a. The arrangement of the air amount adjustment mechanism is not limited to this, and it is preferable that the mechanism is arranged between the connecting duct 74 and the outlet 73a.

In the first and second embodiments, the blower 27 is mounted on the inlet 60a, and the blower 28 is mounted on the outlet 61a. In the third embodiment, the blower 27 is provided between the inlet 72a and the light source 30, and the blower 28 is provided between the outlet 73a and the light source 30. However, the installation positions of the blowers 27 and 28 are not limited thereto, and the installation positions may be set such that the blowers 27 and 28 is mounted on any one of the cooling duct, the connecting duct, and the heating duct so as to send at least a part of the air suctioned from the inlet of the cooling duct to the outlet of the heating duct. Further, the present invention is not limited to the configuration in which the two blowers 27 and 28 are provided. For example, one blower may be mounted on any one of the cooling duct, the connecting duct, and the heating duct.

Fourth Embodiment

Figure 10:
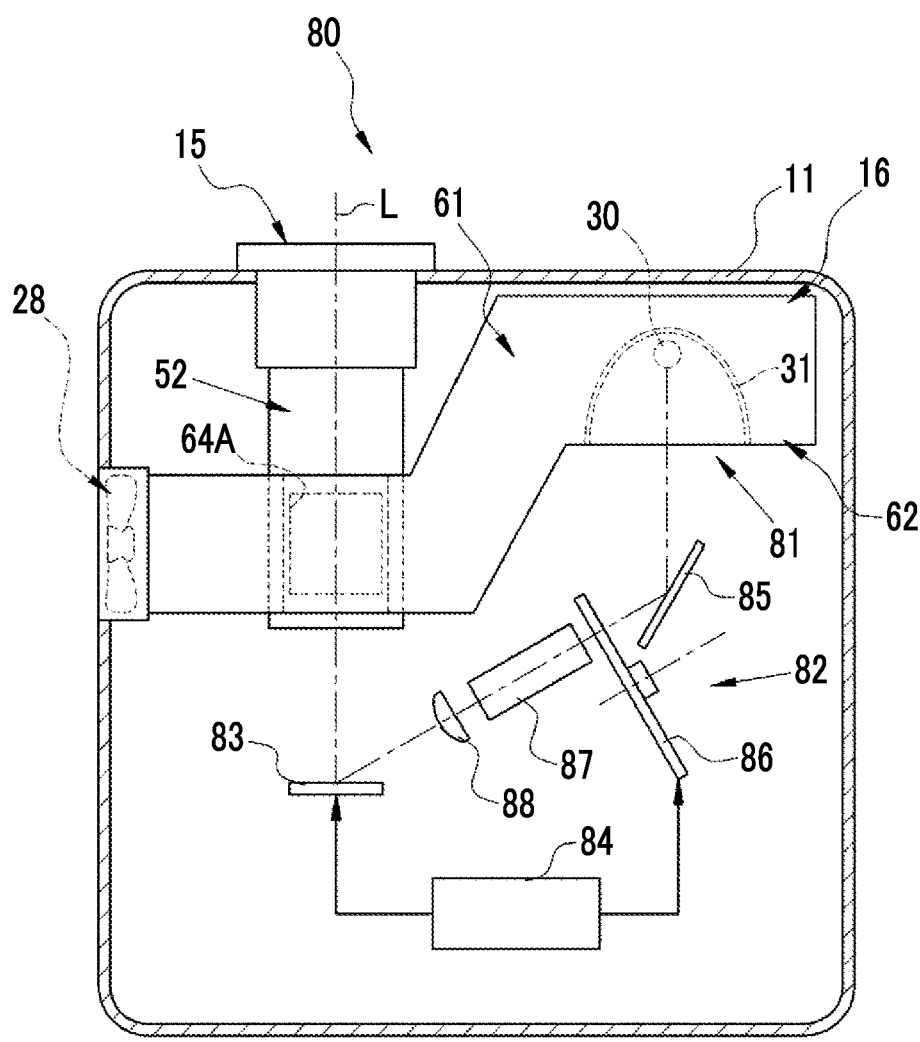
FIG. 10 is a horizontal cross-sectional view illustrating an internal configuration of a projector of a fourth embodiment.

The first to third embodiments have described examples of three-panel-type projectors. In the three-panel-type projector, three image forming panels respectively add image information to the light beams with three colors such as red, green, and blue separated from the light source by dichroic mirrors, and a cross dichroic prism synthesizes the light beams and causes the light to be incident into the projection lens 15. A fourth embodiment shown in FIG. 10 describes an example of a single-panel-type projector in which one image forming panel 83 adds image information to red, green, and blue light beams. In the fourth embodiment, the same parts and members as those of the first to third embodiments are denoted by the same reference numerals, and the description thereof is omitted, and the differences from the first embodiment will be mainly described.

In a projector 80 of the present embodiment, the casing 11 houses a light source section 81, an illumination optical system 82, an image forming panel 83, the projection lens 15, the temperature adjustment section 16, and the control section 84. The light source section 81 comprises the light source 30 and the reflector 31 similar to those of the first to third embodiments.

As in the first and second embodiments, the connecting duct 62 is disposed in the vicinities of the light source 30 and the reflector 31, and the temperature adjustment section 16 cools the first part 52A and heats the second part 52B. In addition, the temperature adjustment section constituting the projector 80 is not limited to the same temperature adjustment section 16 as in the first and second embodiments, and may be the same temperature adjustment section 71 as in the third embodiment.

The illumination optical system 82 comprises a reflection mirror 85, a color wheel 86, an integrator 87, and a condensing lens 88. The reflection mirror 85 changes the direction of the optical axis of the irradiation light which is emitted by the light source 30 and is condensed by the reflector 31. The irradiation light, which is reflected by the reflection mirror 85, is directed to the color wheel 86.

In the color wheel 86, filters of three colors of R, G, and B are equally arranged. The light transmitted through the color wheel 86 is incident into the integrator 87. The integrator 87 totally reflects the incident light onto the inner surface and repeatedly performs the total reflection, thereby uniformizing the density of rays and emitting light. The emitted light is condensed by the condensing lens 88 and irradiates the image forming panel 83. The image forming panel 83 employs a single-panel-type DMD that generates image light with three colors through a single panel. The center of the image forming panel 83 is fixed in a state where the center is shifted downward with respect to the optical axis L of the projection lens 15, in a manner similar to those of the image forming panels 44 to 46 of the first to third embodiments.

The control section 84 sequentially displays images with three colors such as R, G, and B on the image forming surface of the image forming panel 83, and rotates the color wheel 86 in accordance with the images with the three colors displayed on the image forming panel 83. The light, which is emitted from the light source section 81, is time-divided into the respective colors by the color wheel 86, and irradiates the image forming panel 83 through the integrator 87 and the condensing lens 88. The image light, which is subjected to time division by the color wheel 86 and to which image information is added by the image forming panel 83, is projected by the projection lens 15, and thereby a full-color image is displayed on a screen or the like.

In the first to fourth embodiments, a xenon lamp or a halogen lamp, which emits white light, is used as a light source, but the present invention is not limited to this, and an LED light source device, which sequentially emits three colors such as RGB, may be used. In a case where a light source emitting white light is used, a single transmissive color liquid crystal panel may be used as the image forming panel.

In each of the above-mentioned embodiments, the description has been given with reference to the example in the state where the projector is installed on a board such as a table. However, the present invention is not limited to this, and the projector of the present invention may be used to be suspended from the ceiling. In this case, all the expressions such as "upper side", "lower side", "upward", "downward", and the like described in each of the above-mentioned embodiments are reversed in the vertical direction.

In each of the above-mentioned embodiments, the example, in which the image is projected onto the screen, has been described. However, the projection surface is not limited to the screen, and a projector, which projects on various projection surfaces, may be used. In each of the above-mentioned embodiments, propeller fans are used as the blowers 27 and 28, but the present invention is not limited to this, and different blowers such as a sirocco fan may be used.

EXPLANATION OF REFERENCES 10, 70, 80: projector
11: casing
12, 81: light source section
13: color separation section
14: image forming section
15: projection lens
16, 71: temperature adjustment section
17, 84: control section
20: screen
21: zoom dial
22: light amount adjustment dial
23: focus dial
24: vertical focus adjustment dial
25: horizontal focus adjustment dial
26: screen adjustment dial
27, 28: blower
30: light source
31: reflector
32, 33: fly-eye lens
34: polarization conversion element
35: condenser lens
36, 85: reflection mirror
40, 41: dichroic mirror
42, 47, 48: reflection mirror
43: relay lens
44 to 46, 83: image forming panel
49, 88: condensing lens
50: cross dichroic prism
50a, 50b: dichroic surface
51: aperture stop
52: lens barrel
52A, 63A: first part
52B, 64A: second part
60, 72: cooling duct
61, 73: heating duct
62, 74: connecting duct
60a, 72a: inlet
61a, 73a: outlet
63, 64: connection portion
65: rectifying fin
65a: connection pin
66: link rod
77: mesh 78: opening portion
82: illumination optical system
86: color wheel
87: integrator
L1 to L5: first to fifth lenses
L: optical axis of projection lens
Y: distance from optical axis of projection lens to center of image forming panel
H: length of image forming panel in shift direction from optical axis of projection lens

What is claimed is:

1. A projector comprising:
   a light source;
   an image forming panel that modulates light, which is emitted from the light source, on the basis of image information so as to form image light;
   a projection lens that has a lens and a lens barrel holding the lens and projects image light which is formed by the image forming panel, where a center of the image forming panel is disposed to be shifted with respect to an optical axis of the projection lens;
   a cooling duct through which air for cooling a first part of the lens barrel on a side, to which the image forming panel is shifted with respect to the optical axis of the projection lens, passes;
   a heating duct through which air for heating a second part of the lens barrel on a side, which is opposite to the side to which the image forming panel is shifted with respect to the optical axis of the projection lens, passes;
   a connecting duct that connects the cooling duct and the heating duct, causes air from the cooling duct to pass through the light source, and sends the air to the heating duct; and
   a blower that is mounted on any one of the cooling duct, the connecting duct, and the heating duct and sends at least a part of air suctioned from an inlet of the cooling duct to an outlet of the heating duct.

2. The projector according to claim 1, wherein exhaust from the outlet is sent to the second part so as to heat the second part.

3. The projector according to claim 1,
   wherein the cooling duct has a first opening portion that exposes the first part, and
   wherein the heating duct has a second opening portion that exposes the second part.

4. The projector according to claim 1, further comprising an air amount adjustment mechanism that adjusts an amount of air to be sent to the second part, between the connecting duct and the outlet.

5. The projector according to claim 2, further comprising an air amount adjustment mechanism that adjusts an amount of air to be sent to the second part, between the connecting duct and the outlet.

6. The projector according to claim 3, further comprising an air amount adjustment mechanism that adjusts an amount of air to be sent to the second part, between the connecting duct and the outlet.

7. The projector according to claim 1, wherein the lens barrel is made of synthetic resin.

8. The projector according to claim 2, wherein the lens barrel is made of synthetic resin.

9. The projector according to claim 3, wherein the lens barrel is made of synthetic resin.

10. The projector according to claim 4, wherein the lens barrel is made of synthetic resin.

11. The projector according to claim 5, wherein the lens barrel is made of synthetic resin.

12. The projector according to claim 6, wherein the lens barrel is made of synthetic resin.

13. The projector according to claim 1, wherein the first part and the second part are located to be closer to the image forming panel than a position of a stop which determines an F number of the projection lens.

14. The projector according to claim 2, wherein the first part and the second part are located to be closer to the image forming panel than a position of a stop which determines an F number of the projection lens.

15. The projector according to claim 3, wherein the first part and the second part are located to be closer to the image forming panel than a position of a stop which determines an F number of the projection lens.

16. The projector according to claim 4, wherein the first part and the second part are located to be closer to the image forming panel than a position of a stop which determines an F number of the projection lens.

17. The projector according to claim 5, wherein the first part and the second part are located to be closer to the image forming panel than a position of a stop which determines an F number of the projection lens.

18. The projector according to claim 1, wherein in a case where a distance from the optical axis of the projection lens to the center of the image forming panel is Y, a length of the image forming panel in a shift direction is H, and an amount of shift of the image forming panel, which is obtained by dividing the distance Y by the length H, is set as S=Y/H, the amount of shift S is in a range of $0.4<S<0.7$.

19. A method of preventing image deterioration of a projector according to claim 1 including the light source, the image forming panel that modulates light, which is emitted from the light source, on the basis of image information so as to form image light, the projection lens that has the lens and the lens barrel holding the lens and projects image light which is formed by the image forming panel, where the center of the image forming panel is disposed to be shifted with respect to the optical axis of the projection lens, the method comprising:
   connecting, through the ducts, the first part of the lens barrel on a side to which the image forming panel is shifted with respect to the optical axis, the light source, and the second part of the lens barrel on a side which is opposite to the side to which the image forming panel is shifted with respect to the optical axis, and
   passing air, which is suctioned from the inlet of the duct close to the first part, through the ducts close to the first part, the light source, and the second part, sequentially, and sending air from the outlet of the duct, which is close to the second part, to the second part, by the blower provided in the duct.

20. A method of preventing image deterioration of a projector according to claim 1 including the light source, the image forming panel that modulates light, which is emitted from the light source, on the basis of image information so as to form image light, the projection lens that has the lens and the lens barrel holding the lens and projects image light which is formed by the image forming panel, where the center of the image forming panel is disposed to be shifted with respect to the optical axis of the projection lens, the method comprising:
   connecting, through the ducts, the first part of the lens barrel on a side to which the image forming panel is shifted with respect to the optical axis, the light source, and the second part of the lens barrel on a side which is opposite to the side to which the image forming panel is shifted with respect to the optical axis;

making the ducts have a first opening portion which exposes the first part and a second opening portion which exposed the second part; and passing air, which is suctioned from the inlet of the duct close to the first part of the lens barrel, through the first part, the light source, and the second part sequentially, by the blower provided in the duct.

* * * * *